(No Model.)

G. M. KITZMILLER & H. A. GILLIS.
TYPE WRITER SCALE.

No. 587,587. Patented Aug. 3, 1897.

Witnesses
Samuel Hanford
A. J. Caughery

Inventors
George M. Kitzmiller
Harry A. Gillis

UNITED STATES PATENT OFFICE.

GEORGE M. KITZMILLER AND HARRY A. GILLIS, OF ROANOKE, VIRGINIA.

TYPE-WRITER SCALE.

SPECIFICATION forming part of Letters Patent No. 587,587, dated August 3, 1897.

Application filed March 22, 1897. Serial No. 628,793. (No model.)

*To all whom it may concern:*

Be it known that we, GEORGE M. KITZMILLER and HARRY A. GILLIS, citizens of the United States, residing at Roanoke, in the county of Roanoke and State of Virginia, have invented a new and useful Improvement in Type-Writers, (more particularly type-writer scales,) of which the following is a specification.

The object of our invention is to provide a scale for type-writing machines by the use of which the operator may be enabled to determine quickly and accurately the starting-point for any given heading or headings in order to locate the said heading or headings centrally on the sheet, thus leaving an equal margin on each side of said heading or headings.

Our further object is to provide a scale for said machines which will facilitate the work of the operator in locating accurately and quickly the proper points of divisions for columns, headings, and serial writings, arranged in columns.

These objects we secure by the novel construction and details thereof, as hereinafter described with reference to the accompanying drawings, and more particularly pointed out in the claims.

Figure 1:
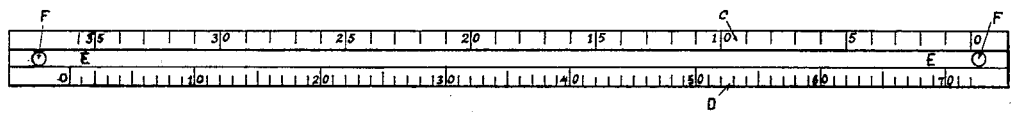
Figure 2:
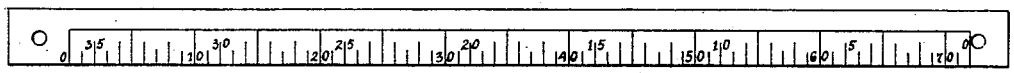
Figure 3:
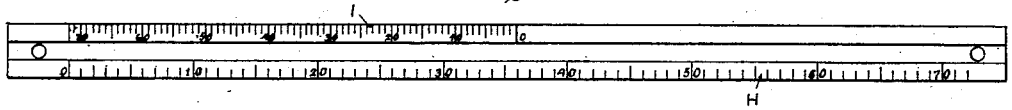
Figure 4:
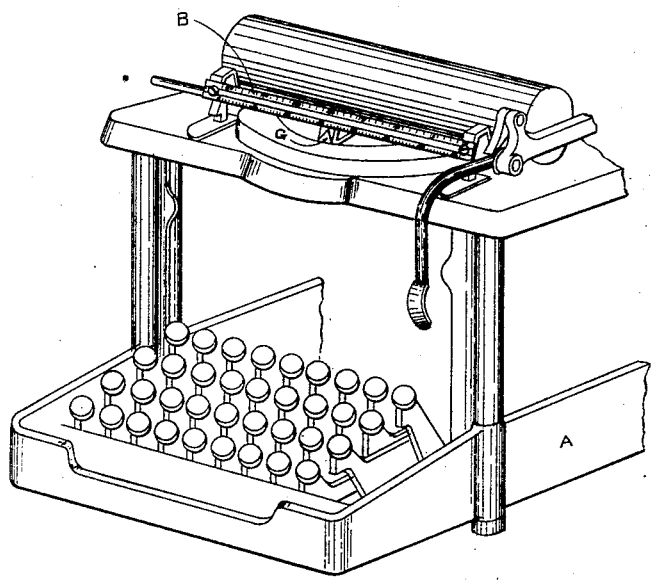

In the accompanying drawings, forming a part of this specification, Figure 1 shows one form of our scale. Figs. 2 and 3 show other forms of our scale. Fig. 4 represents a perspective view of the forward portion of a type-writer with our improved scale applied thereto.

A in the drawings represents a type-writer frame, and B our improved scale. The said scale is preferably composed of a strip of metal or other material divided into two longitudinal sections C D, Fig. 1. Each of said sections is in turn divided into a plurality of scale-divisions, those of the scale D, which is the ordinary scale, extending from "0" to "72", as shown, the number of divisions or graduations depending upon the design of type-writer to which the scale is applied. The reading of the scale in this case is from left to right, but may be from right to left, depending upon the design of type-writer to which it is applied. Section C is provided with scale-divisions reading from "0" to "36" or to one-half the number of divisions of the scale on section D, and reading in the reverse direction to said scale D.

It will be observed from the foregoing description that the graduations of the two scales are in the ratio of two to one, the graduations of scale C being just twice as long as that of scale D—that is to say, the linear distance between the graduating-lines of one set of divisions is twice the corresponding distance between the graduating-lines of the other divisions.

Located preferably between the two scales and running at right angles to the graduations or divisions thereof is a strip E of suitable material, such as celluloid, enameled paper, or the like, adapted to receive erasable entries for the purpose hereinafter more particularly described.

The strip of metal upon which the scale-divisions are formed is provided at each end with a suitable aperture F, through which the screws or other fastenings are passed to secure the scale to the type-writer frame. If so desired, the scales may be formed directly upon the metal of the type-writer, as is the practice in some type-writers.

The relative location of scales C and D may be reversed, so that scale C will appear underneath instead of on top, or in the form of our scale shown in Fig. 2 the half-divisions or graduations may be formed by extending each alternate division or graduation of the scale-section D and placing its corresponding number for each group of divisions, as shown in Fig. 2. The graduations on this form of our scale may be reversed, so that they will appear above or below the strip of celluloid, enameled paper, or other writing material as desired and as may be most convenient for the design of type-writer to which applied.

Fig. 3 shows still another variety or type of our scale, which is slightly different in its application, but which embodies the same principles as the forms already described. In this scale the lower portion H, which is the ordinary scale, is numbered from "0" to "72" and from left to right, as is the ordinary practice. The upper portion of the scale I has its zero-point at the middle and is numbered from this zero-point to the left, the divisions or graduations being one-half the length of the divisions or graduations on the lower portion H of the scale, the ratio between the two sets of graduations being as two is to one, as in the other forms described.

If the order of the numbers should be reversed in adapting this form of scale to some kinds of type-writers, it may be necessary to place the particular numbers of the portion I on the right of the center instead of on the left. By the use of this double scale reading in reverse directions the operator is enabled to determine quickly and accurately the starting-point for any heading in order to bring an equal margin on each side of the heading, or, in other words, to locate it centrally. The method of operation to secure this result by the scale on Figs. 1 and 2 is as follows: Start the carriage at zero on section D, in this instance the lower scale, depress the space-bar of the type-writer as many times as there are letters and spaces in the word or words to be written for the title or heading. The number immediately over the pointer G on scale C is the proper starting-point on scale D. Should the index or pointer stop in the middle of the division of the scale C, the next higher division should be taken. For example, in order to find the proper location for the word "Norfolk" it would be necessary to press down the space-bar seven times. This on a Remington type-writer No. 6 would bring the index or pointer at "31½" on the upper scale C. The carriage is next set by the lower scale D at "32" and the word "Norfolk" struck off, the same coming in the middle of the sheet. It will be observed that by the employment of this scale the position of a heading upon a page may be secured by simply running off the word or words on the machine by the use of the spacing mechanism and thus securing the number on the lower scale at which the heading should be started. If the scale shown by Fig. 3 is used, the operation would be slightly different and would be as follows: The number of letters and spaces in the title, which is to be placed centrally, should be obtained, as before, by depressing the space-bar the proper number of times. The number on the lower portion H opposite the pointer would indicate the proper number at which to place the pointer on the upper left-hand portion of the scale I and the heading or title written, as described above.

It will be observed that in all the forms of our scale by the operation of the spacing mechanism to correspond to the number of letters and spaces in a given heading or title the pointer on the machine will indicate on one scale the division or graduation on the other scale at which to set the said pointer in order to locate the said heading or title centrally of the page.

The object of the strip of celluloid, enameled paper, or other writing material arranged as described is to enable the operator to divide off with a pencil a certain number of points, by which means he can quickly and accurately locate the number of divisions, by which means he can quickly and accurately locate the proper divisions for columns, headings, &c., instead of depending merely upon bringing the pointer G, Fig. 1, to certain arbitrary numbers at each column. For example:

NORFOLK AND WESTERN RAILWAY COMPANY LOCOMOTIVES.

(Other than those Covered by the Equipment Mortgage of 1888.)

| Engine No. | Class. | Type. | Maker. | Date built. | Cost if new 10,1,'96. | Age 10,1,'96. | Depreciated value. |
|---|---|---|---|---|---|---|---|
| 27 | K | Eight-wheel | Baldwin | 2, '81 | $7,500 | 15 8 | $2,900 |
| 28 | K | Eight-wheel | Baldwin | 2, '81 | 7,500 | 15 8 | 1,050 |

If this celluloid or other material were not embodied in the scale, the operator would have to bring the pointer G, Fig. 1, opposite the following divisions "0" "6" "11" "30" "39" "48" "59" for each line in the body of the table consecutively, these numbers being taken from scale D, but by having the celluloid or other material it is simply necessary to make a series of pencil-marks vertically over these numbers on section D, so that no memorizing or special note of the numbers need be kept for this purpose, and hence not only are time and labor saved to a considerable extent, but the liability to error is materially diminished.

We claim as our invention—

1. In a type-writing machine, the combination with the pointer and spacing mechanism, of a scale having two sets of divisions thereon reading in reverse directions, said divisions being formed by graduating-lines and the linear distances between the graduating-lines of one set of divisions being twice the corresponding distances between the graduating-lines of the other set of divisions, whereby in the operation of the spacing mechanism to correspond to the number of letters and spaces in a given heading the pointer will indicate on one set of divisions the point to set said pointer on the other set of divisions in order to locate said heading centrally of the page, substantially as described.

2. In a type-writing machine, the combination with the pointer and spacing mechanism, of a scale having two sets of divisions arranged one above the other and reading in reverse directions, the lower set constituting the ordinary scale, the said divisions being formed by graduating-lines, and the linear distances between the graduating-lines of the upper set of divisions being twice the corresponding distances between the graduating-lines of the lower set of divisions, whereby in the operation of the spacing mechanism to correspond to the number of letters and spaces in a given heading, the pointer will indicate on the upper scale the number of the division to start from on the lower scale in order to locate said heading centrally of the page, substantially as described.

3. In a type-writing machine, the combination with the pointer and spacing mechanism, of a double scale having two sets of divisions reading in reverse directions, the said divisions being formed by graduating-lines and the linear distances between the graduating-lines of one set of divisions being twice the corresponding distances between the graduating-lines of the other set, and provided with a strip of suitable material arranged on the scale at right angles to the graduating-lines and adapted to receive erasable entries thereon, substantially as and for the purpose set forth.

In testimony whereof we affix our signatures in presence of two witnesses.

GEORGE M. KITZMILLER.
HARRY A. GILLIS.

Witnesses:
SAMUEL HANFORD,
A. J. LOUGHERY.